United States Patent [19]

Page et al.

[11] Patent Number: 4,621,722

[45] Date of Patent: Nov. 11, 1986

[54] CONTROL SYSTEM FOR VEHICLE TRANSMISSION

[75] Inventors: Robert P. Page; John N. Cheel; Stuart I. Howarth; John P. Millward, all of Birmingham, England

[73] Assignee: Lucas Industries public limited company, Birmingham, England

[21] Appl. No.: 680,556

[22] Filed: Dec. 11, 1984

[30] Foreign Application Priority Data

Jan. 24, 1984 [GB] United Kingdom ............... 8401822

[51] Int. Cl.⁴ ............................................. F16D 47/06
[52] U.S. Cl. .............................. 192/0.055; 192/0.076; 192/0.094
[58] Field of Search ............. 192/0.055, 0.094, 0.076, 192/0.075, 0.07, 4 A, 0.096, 0.033; 361/242

[56] References Cited

U.S. PATENT DOCUMENTS

| | | | |
|---|---|---|---|
| 4,081,065 | 3/1978 | Smyth et al. | 192/0.076 |
| 4,200,175 | 4/1980 | Dick | 192/0.033 |
| 4,265,346 | 5/1981 | Emmadi | 192/0.076 X |
| 4,403,682 | 9/1983 | Norris et al. | 192/0.033 |
| 4,407,398 | 10/1983 | Fiala | 192/0.055 |
| 4,413,714 | 11/1983 | Windsor | 192/0.033 |
| 4,445,603 | 5/1984 | Filsinger | 192/0.055 |
| 4,475,637 | 10/1984 | Oguma et al. | 192/0.076 X |
| 4,497,397 | 2/1985 | Windsor et al. | 192/0.052 |
| 4,518,068 | 5/1985 | Oguma et al. | 192/0.076 X |

Primary Examiner—Lawrence Staab
Assistant Examiner—Martin G. Belisario

[57] ABSTRACT

A control system for a vehicle transmission in which the clutch is controlled by an actuator including a cylinder to which fluid can be supplied by way of valves. The valves are controlled to give at least two phases of clutch engagement. In the first phase the valves are controlled by a processor so that the clutch starts to transmit a small torque. This phase is followed by a further phase in which if the vehicle brakes are applied the clutch is controlled in accordance with the law $E = KdN/dT$ where E equals the error which the control system seeks to minimize, N is the engine speed, T the time and K a constant. If the brakes are not applied or when they are released the clutch is controlled so as to control at one of a plurality of constant rates, the acceleration of the engine.

13 Claims, 1 Drawing Figure

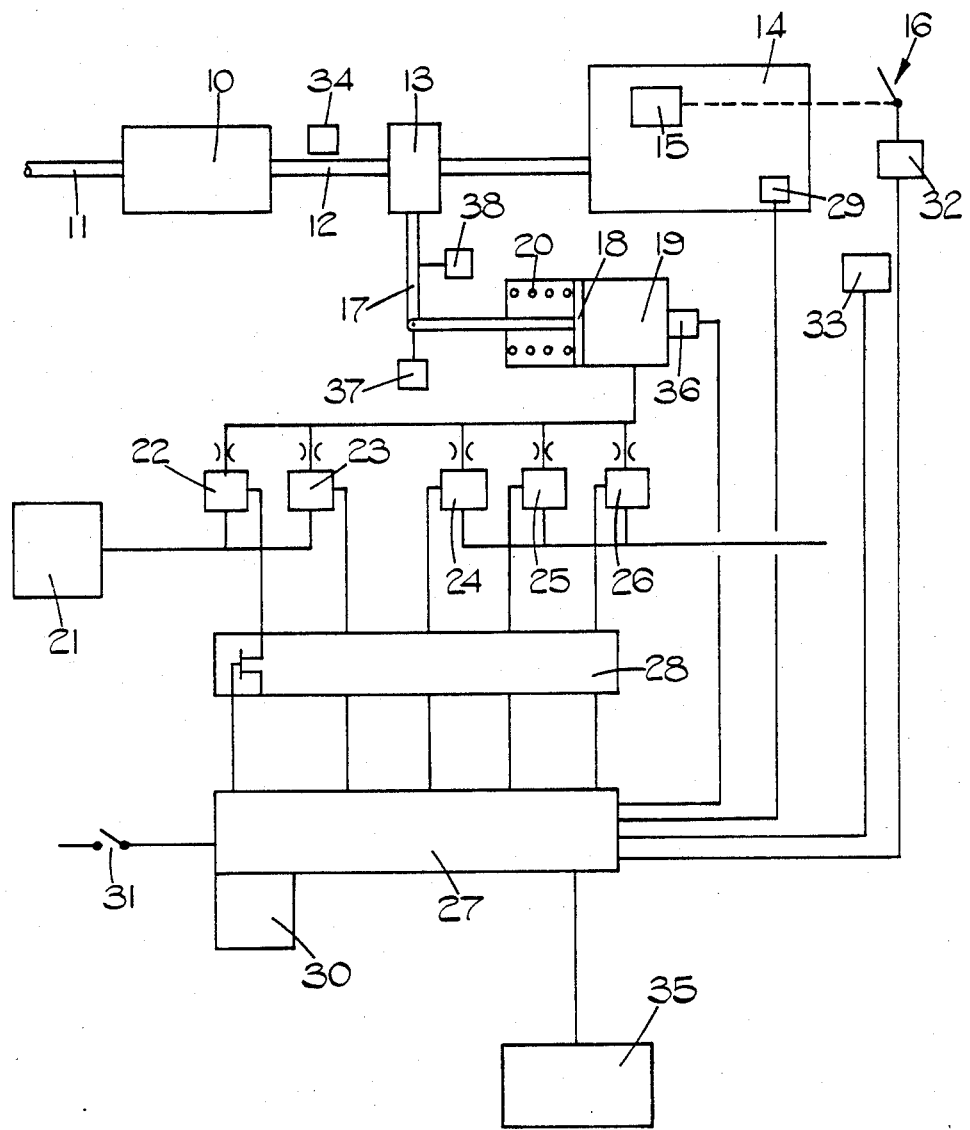

CONTROL SYSTEM FOR VEHICLE TRANSMISSION

This invention relates to a control system for a vehicle clutch having an input member coupled to the output shaft of the vehicle engine and an output member coupled to the input of a multi-ratio gearbox and a powered actuator for controlling the operation of the clutch, said powered actuator being controlled by said control system and including a clutch actuating cylinder.

It is known to design the control system so that the equivalent of "automatic transmission" is obtained, in this case the control system also providing signals which cause different ratios of the gearbox to be selected at the appropriate time. This type of transmission has the advantage over a conventional automatic transmission employing a hydraulic coupling or torque converter in that its efficiency is the same as a conventional manual transmission system. A problem with this form of transmission is to achieve engagement of the clutch in as quick and smooth a manner as possible.

A number of clutch control systems are known for effecting engagement of the clutch while moving the vehicle from rest. The known systems control the clutch according to a single function of engine speed, engine acceleration throttle pedal position or vehicle speed. The known systems can give satisfactory performance under a limited range of operating conditions but each displays a shortcoming when used in the wide range of operating conditions encountered in the normal use of a vehicle. For example, one system seeks to control the engine speed by varying the state of engagement of the clutch. If the engine is a compression ignition engine and its fuel system is fitted with an "all speed" governor, the governor will also seek to control the engine speed leading to conflict between the clutch control system and the governor. Moreover it is often assumed that the position of the throttle pedal is an indication of the torque generated by the engine and this assumption is not true in the case of an "all speed" governor. Many of the known systems whilst giving acceptable control of the clutch so far as the driver of the vehicle is concerned, allow clutch slip to take place for an extended period thereby resulting in overheating and rapid wear of the clutch.

The object of the present invention is to provide a control system for a vehicle transmission system of the kind specified in a simple and convenient form.

According to the invention a control system for a vehicle friction clutch comprises first valve means for admitting fluid to said actuating cylinder to effect the process of engagement of the clutch in at least two distinct operational phases, first means for sensing a demand for vehicle movement and acting to operate said first valve means to admit fluid to said cylinder to cause engagement of the clutch, sensing means for sensing the attainment of a predetermined clutch engagement and thereby indicating the end of a first operational phase, the process of engagement of the clutch then continuing in a further phase in which said valve means is operated so that the clutch is engaged in a controlled manner.

According to a further feature of the invention in said further phase the clutch is controlled to minimise the error $E$, in accordance with the law $E = K dN/dT$ where $E$ is the error, $K$ is a proportionality constant, $N$ the engine speed and $T$ the time, the control system including second valve means for allowing fluid to escape from said cylinder in the event that $E$ becomes negative.

According to a still further feature of the invention in said further phase the fluid is admitted to said cylinder at one of a plurality of constant rates depending upon the acceleration of the engine.

According to a still further feature of the invention in a final phase of clutch operation said first valve means when the speeds of the input and output members of the clutch are approximately equal, is operated to allow complete filling of the cylinder.

It is proposed to effect the clutch engagement in four phases some of which under certain operating conditions will not be used. The first phase is the movement of the clutch plate from the completely disengaged condition to a position in which the clutch is just starting to transmit torque. This phase is always used whenever the vehicle is being moved from rest.

The second phase is used only when manoeuvering the vehicle and when starting from rest on an adverse incline. In this phase clutch slip is allowed. The control of clutch engagement in this phase follows the law $E = K dN/dT$ where $K$ is a proportionality constant, $N$ the engine speed, $E$ the error which the control system seeks to make zero and $T$ the time.

The third phase follows on from the second phase when the vehicle is being started from rest on an adverse incline. When manoeuvering the vehicle the third phase together with the fourth phase to be described are not used. In the third phase the clutch plates are engaged at one of several constant rates, the actual rate being determined by the engine acceleration with limits imposed if it seems that the engine speed will exceed the maximum torque speed or if the engine speed will fall below the idling speed. The third phase can follow on from the first phase in certain operating conditions for example when a normal vehicle start is being made on level ground or when the vehicle is facing downhill.

The fourth phase follows on from the third phase when the input and output members of the clutch have assumed the same speed and in this phase the clutch is fully engaged.

An example of a clutch control system in accordance with the invention will now be described with reference to the accompanying diagrammatic drawing.

The transmission of the vehicle comprises a multi-ratio gearbox 10 having an output shaft 11 which is connected to the driven road wheels of the vehicle and an input shaft 12 which is connected to the output member of a dry plate clutch 13. The input member of the clutch is connected to the crankshaft of the vehicle engine indicated at 14. The engine 14 in the particular example, is a diesel engine having a fuel system 15. A control member of the fuel system is connected to the throttle control 16 of the vehicle.

The clutch 13 is of the conventional type employing a release lever 17 which in normal circumstances would be connected to the clutch control pedal of the vehicle. In this case however the release lever 17 is connected to a piston 18 housed within a cylinder 19 and the piston is biased by a spring 20 so that when there is no pressure within the cylinder 19, the piston is urged to a position in which the clutch is disengaged. Air under pressure from a source 21 can be admitted to the cylinder 19 by way of one or the other of a pair of electromagnetically operable valves 22, 23 which constitute first valve means. Each valve has in series therewith a restrictor. The restrictor associated with the valve 22 permits flow of air into the cylinder 19 at a slow rate as compared with the restrictor associated with the valve 23. The flow of air out of the cylinder 19 is controlled by second valve means which comprises valves 24, 25, 26, the air flowing to a suitable exhaust. The valves 24, 25 and 26 also have associated restrictors respectively, so that the valve 24 allows air to escape at a slow rate, opening of the valve 26 allows air to escape at a high rate and opening of the valve 25 allows air to escape at a rate which is higher than that of the valve 24 but lower than that of the valve 26. The sizes of the restrictors associated with the valves have to be very carefully chosen to give the required speed and accuracy of response without causing oscillation.

The flow of electric current to the windings of the valves is controlled by a micro-processor 27 and an interface unit 28 is provided between the outputs of the micro-processor and the valves the interface unit conveniently incorporating field effect transistors.

The micro-processor 27 also controls selection of the ratios of the gearbox 10 but since the present specification is concerned only with the control of the clutch the way in which gear selection is obtained, will not be described.

The control laws discussed above include an engine speed term and the micro-processor is therefore provided with a signal from a speed transducer 29 on the engine. Conveniently the transducer 28 is of the type which produces a series of pulses at a frequency which directly depends upon the engine speed.

The micro-processor is also supplied with signals from transducers 32, 33 which provide an indication as to the state of the throttle pedal 16 of the vehicle and as to whether the brakes of the vehicle are applied respectively. In addition a transducer 34 provides a signal to the micro-processor indicative of the speed of the input shaft of the gearbox.

The micro-processor 27 is provided with a memory 30 and also is provided with a switch 31 which is closed by the driver of the vehicle when requiring to manoeuvre the vehicle. The switch 31 can only be closed when first or reverse gear are selected.

The operation of the system will now be described assuming that the engine is at rest. In this situation the spring 20 has urged the piston 18 in the direction to disengage fully the clutch. The transmission selector lever which forms part of the transmission control 35 which is connected to the micro-processor, will be in a neutral or start position to enable the engine to be started and once this has occurred air under pressure will be available from the source 21 and it is arranged that the cylinder 19 is supplied with air under pressure which has the effect of engaging the clutch so that the input shaft 12 of the gearbox and any component parts of the gearbox which are driven thereby will be rotated. When the transmission control is moved to the drive position a suitable ratio of the gearbox for starting purposes, is selected. This may be the lowest ratio i.e. that which gives the maximum engine speed for a given vehicle speed, or it may be a higher gear ratio. Before selection can take place however whichever of the valves 22, 23 was opened to admit air under pressure to the cylinder, must be closed and the valve 26 is opened to allow the air under pressure in the cylinder 19 to escape quickly. This disengages the clutch and permits engagement of the aforesaid gear ratio. The restrictor associated with the valve 26 is of a size to permit air to escape from the cylinder 19 as quickly as possible but at the same time is chosen to provide a damping effect to avoid oscillation of the piston and the parts connected thereto.

Once the appropriate gear ratio has been selected, the driver raises the engine speed by depressing the throttle pedal a signal indicative of which is provided by the transducer 32 and the first phase of operation of the clutch can start. As soon as the driver depresses the throttle the clutch is engaged to a point where the clutch is transmitting the minimum possible torque and once this engagement has been achieved either phase two or phase three becomes active dependent on the state of the brake or manoeuvre switch.

The end of the first phase of engagement can be sensed using the transducer 34 which when torque is transmitted by the clutch will signal movement of the input shaft of the gear box. The signal provided by the transducer 34 can be examined from the point of view of speed or acceleration and when a predetermined value of either speed or acceleration has been detected, phase two or phase three of clutch engagement starts. The detection of the speed or acceleration of the input shaft of the gearbox does unfortunately result in the clutch transmitting more torque than is desirable. It is therefore proposed to monitor the fluid pressure in the cylinder 19 using a pressure transducer 36 and to measure the pressure in the cylinder at which the aforesaid predetermined value of input shaft speed or acceleration is attained. From this value of pressure is subtracted an offset to provide a so-called target pressure which provides the reference for clutch control during phase one of the clutch engagement. The offset is chosen to provide a target pressure at which the torque transmitted by the clutch is the required value and is of course below the value of torque transmitted when the speed or acceleration are sensed. Unfortunately the target pressure must be updated because wear of the clutch will take place and as wear takes place the torque transmitted at a given target pressure will gradually fall. It is necessary to ensure that the updating of the target pressure can only take place when the vehicle is at rest with the brakes applied. This is to avoid the possibility of incorrect updating taking place when for example the input shaft of the gearbox is rotating. A further safeguard can be that the pressure must lie within prescribed limits before updating can take place. With the arrangement described updating of the target pressure can result in an increase or a decrease in the value of the target pressure so that besides compensating for wear the system can also accommodate replacement of the clutch.

If when the end of phase one is reached, the brakes are applied implying that the vehicle is on an adverse slope, or the manoeuvre switch has been operated, phase two is active. The transducer 29 provides to the micro-processor a series of pulses from which it is possible for the micro-processor to determine the rate of change of engine speed. This calculation is carried out on the basis of a program stored in the memory 30. When phase two is active, the clutch is controlled in accordance with the law $E = K dN/dT$. The micro-processor determines the error E and compares the signal with four thresholds which are stored in the memory 30. Two of these thresholds are positive and two are negative. If the error is greater than the largest positive threshold then the micro-processor switches on the valve 23 which allows air under pressure to quickly flow into the cylinder 19. If on the other hand the value of the error lies between the two positive thresholds the valve 22 will be energised to allow air to flow into the cylinder 19 at a slow rate. When the error is less than the smaller positive threshold but not as negative as the smaller negative threshold, all the valves remain closed and the pressure in the actuator cylinder 19 will be held constant. When the error lies between the negative thresholds the micro-processor 27 energises the valve 24 which allows air to escape from the cylinder 19 at a slow rate and if the error is more negative than the more negative threshold the micro-processor energises the valve 25 to allow air to escape from the cylinder 19 at a higher rate. It should be noted that the error signal can during clutch engagement assume a negative value. This does not however require action on the part of the driver of the vehicle. As previously stated, the valve 26 when energised allows air to escape from the cylinder 19 at a substantially unrestricted rate and this valve is energised when rapid disengagement of the clutch is required prior to stopping or prior to a change in the selected gear ratio of the gearbox.

As the pressure in the cylinder 19 increases the clutch will engage and during the engagement process the rate of change of engine speed is continuously monitored and the error signal calculated. It will be appreciated that the engine speed can increase or decrease resulting therefore in a change in the error signal which as the aforesaid thresholds are crossed, will result in a change in the settings of the valves and appropriate adjustments of the rate of clutch engagement and also when the error is negative in partial disengagement of the clutch.

If the manoeuvre switch 31 has not been operated, phase three commences when the brakes are released as indicated by the transducer 33, alternatively if the brakes have not been applied during the engagement, phase three commences as soon as phase one is complete.

In phase three the pressure in the cylinder 19 is increased at one of several constant rates under the control of the first valve means. The valves 22 and 23 together with the associated restrictors can only give three rates but further rates are possible by pulsing the valves. The particular rate which is used depends upon the acceleration of the engine which is determined from the signal provided by the transducer 29. In practice the greater the engine acceleration, the faster is the rate of clutch engagement. It is desirable to prevent the engine speed from rising above the speed at which it develops its maximum torque and it is essential to prevent the engine speed from falling below its idling speed. If it seems therefore that these limits will be exceeded appropriate action is taken to alter the pressure in the cylinder.

Phase three of the clutch engagement process is regarded as complete when the speeds of the input and output members of the clutch are approximately equal. The fourth phase of clutch engagement follows on from the third phase and comprises opening valves 22 and 23 to fill the cylinder 19. The clutch is therefore able to transmit its maximum torque.

While in the particular example the end of the first phase of the clutch engagement process has been associated with the attainment of a target pressure as measured by the transducer 36 in the clutch actuating cylinder, it will be appreciated that instead of the pressure within the cylinder being used to indicate this desired condition, other means could be used, e.g. the force as detected by a strain-gauge 37 positioned at the pivot between the cylinder piston rod and the release lever, or the displacement of the piston 18 or any associated components which are moved by the piston could be used instead of pressure. Consequently, a displacement transducer 38 associated with the release lever 17 could be used to detect the position of the clutch when a certain speed of acceleration is indicated by transducer 34 and from this value of displacement is subtracted an offset to provide a so-called target displacement which provides the reference for clutch control during phase one of the clutch engagement. Updating with changes such as clutch wear will follow in the same manner as that described with respect to the target pressure measurement described earlier.

We claim:

1. A control system for a vehicle clutch having an input member coupled to the output shaft of the vehicle engine and an output member coupled to the input shaft of a multi-ratio gearbox and a powered actuator including a clutch actuating cylinder, said control system comprising first valve means for admitting fluid to said actuating cylinder to effect the process of engagement of the clutch in at least two distinct operational phases, first means for sensing a demand for vehicle movement and acting to operate said first valve means to admit fluid to said cylinder to achieve a target force tending to cause engagement of the clutch, means for sensing the attainment of said target force and hence a predetermined clutch engagement and the end of a first operation phase of clutch engagement, the process of engagement of the clutch then continuing in a further phase in which said valve means is operated so that the clutch is further engaged in a controlled manner and processing means for determining said target force when the vehicle is at rest by measuring the values of force required to cause a predetermined acceleration or speed of the input shaft of the gearbox and subtracting an offset value from said value to provide said target force.

2. A control system according to claim 1 in which in said further phase the clutch is controlled to minimize the error E, in accordance with the law $E = K dN/dT$ where E is the error, K is a proportionality constant, N the engine speed and T the time, the control system including second valve means for allowing fluid to excape from said cylinder in the event that E becomes negative.

3. A control system according to claim 1 in which in said further phase the fluid is admitted to said cylinder at one of a plurality of constant rates depending upon the acceleration of the engine.

4. A control system according to claim 1 or claim 2 in which in a final phase of clutch operation said first valve means when the speeds of the input and output members of the clutch are approximately equal, is operated to allow complete filling of the cylinder.

5. A control system according to claim 1 in which said sensing means includes a first transducer for providing a signal indicative of rotation of the output member of the clutch.

6. A clutch system according to claim 5 in which said sensing means includes a second transducer responsive to the fluid pressure in said cylinder and said processing means is responsive to the signals provided by said first and second transducers to initially determine a target pressure which represents said target force, the attainment of said target pressure being used in following clutch engagment sequences to indicate the end of the first phase of clutch engagement.

7. A clutch system according to claim 5 in which said sensing means includes a second transducer responsive to displacement of the piston in said cylinder and said processing means is responsive to the signals provided by said first and second transducers to initially determine a target displacement which represents said target force, the attainment of said target displacement being used in following clutch engagement sequences to indicate the end of the first phase of clutch engagement.

8. A control system according to claim 6 or claim 7 including a third transducer response to the setting of the vehicle brakes, the updating of said target force taking place only when the brakes of the vehicle are applied.

9. A control system according to claim 8 in which the signal provided by the third transducer is utilized to determine the nature of the further phase of clutch engagement.

10. A control system according to claim 9 in which when the brakes of the vehicle are applied, the control system controls the clutch in accordance with the law $E = KdN/dT$ where E equals the error which the control system seeks to minimize, K is a proportionality constant, N the engine speed and T the time.

11. A control system according to claim 10 in which the control system includes a manoeuvre switch which when closed and irrespective of whether the vehicle brakes are applied causes the clutch engagement to follow the aforesaid law.

12. A control system according to claim 10 in which when the vehicles brakes are not applied or are released after control of the clutch in accordance with said law, fluid is admitted to said cylinder at one of a plurality of constant rates depending upon the acceleration of the engine.

13. A control system according to claim 12 in which when the speed of the input and output members of the clutch is substantially equal fluid is admitted to said cylinder to effect full engagement of the clutch.

* * * * *